US006664004B2

(12) United States Patent
Krause et al.

(10) Patent No.: US 6,664,004 B2
(45) Date of Patent: Dec. 16, 2003

(54) ELECTRODE COMPOSITIONS HAVING IMPROVED CYCLING BEHAVIOR

(75) Inventors: Larry J. Krause, Stillwater, MN (US); James R. Landucci, St. Paul, MN (US); Kevin W. Eberman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 326 days.

(21) Appl. No.: 09/883,865

(22) Filed: Jun. 18, 2001

(65) Prior Publication Data

US 2002/0031708 A1 Mar. 14, 2002

Related U.S. Application Data

(63) Continuation-in-part of application No. 09/751,168, filed on Dec. 29, 2000, now abandoned.
(60) Provisional application No. 60/175,893, filed on Jan. 13, 2000.

(51) Int. Cl.[7] .................................................. H01M 4/62
(52) U.S. Cl. ...................... 429/232; 429/220; 429/225; 429/226; 429/229; 429/231.9; 429/231.95; 252/512; 252/518.1; 252/519.5; 252/519.54; 252/520.1
(58) Field of Search ............................ 252/512, 518.1, 252/520.1, 521.3, 519.5, 519.54; 429/231.9, 231.95, 220, 225, 226, 229, 232, 217

(56) References Cited

U.S. PATENT DOCUMENTS

| 4,623,597 A | * | 11/1986 | Sapru et al. ................. 429/101 |
| 4,731,133 A | * | 3/1988 | Dermarkar .................... 75/249 |
| 4,751,086 A | | 6/1988 | Jeffrey et al. |
| 4,948,558 A | | 8/1990 | Skinner et al. |
| 5,209,995 A | | 5/1993 | Tada et al. |
| 5,554,456 A | | 9/1996 | Ovshinsky et al. |
| 5,556,721 A | | 9/1996 | Sasaki et al. |
| 5,721,065 A | | 2/1998 | Collien et al. |
| 5,789,114 A | | 8/1998 | Adachi et al. |
| 5,840,440 A | | 11/1998 | Ovshinsky et al. |
| 5,922,491 A | | 7/1999 | Ikawa et al. |
| 6,030,726 A | * | 2/2000 | Takeuchi et al. ......... 429/231.8 |
| 6,203,944 B1 | | 3/2001 | Turner et al. |
| 6,428,933 B1 | * | 8/2002 | Christensen et al. ... 429/231.95 |
| 6,528,208 B1 | * | 3/2003 | Thackeray et al. ....... 429/218.1 |

FOREIGN PATENT DOCUMENTS

| EP | 0 209 402 A1 | 1/1987 |
| EP | 0 750 359 B1 | 8/1999 |
| EP | 1 024 544 A2 | 8/2000 |
| EP | 1 028 476 A1 | 8/2000 |
| EP | 1 033 767 A1 | 9/2000 |
| EP | 1 039 568 A1 | 9/2000 |
| JP | 6-325764 | 11/1994 |
| JP | 7-296812 | 11/1995 |
| JP | 10-223221 | 8/1998 |
| JP | 10-294112 | 11/1998 |
| WO | WO 99/49532 | 9/1999 |
| WO | WO 00/03444 | 1/2000 |
| WO | WO 00/60691 | 10/2000 |

* cited by examiner

*Primary Examiner*—Bruce F. Bell
(74) *Attorney, Agent, or Firm*—Dorothy P. Whelan; Lucy C. Weiss

(57) ABSTRACT

An electrode composition that includes a plurality of composite particles and a plurality of electrically conductive diluent particles admixed with the composite particles. Each of the composite particles includes an electrochemically active metal particle and an electrically conductive layer partially covering the particle. In one aspect, the layer is present in an amount no greater than about 75 wt. % of the composite, while in another aspect the layer is present in an amount no greater than about 75 vol. % of the composite. Also featured are lithium ion batteries featuring electrodes made from these compositions.

26 Claims, 8 Drawing Sheets

ELECTRODE COMPOSITIONS HAVING IMPROVED CYCLING BEHAVIOR

STATEMENT OF PRIORITY

This application is a continuation-in-part of Krause et al., U.S. Ser. No. 09/751,168, entitled "Electrode Compositions Having Improved Cycling Behavior," filed Dec. 29, 2000, now abandoned, which, in turn, derives priority from a provisional application filed on Jan. 13, 2000 bearing Ser. No. 60/175,893. Both are hereby incorporated by reference in their entirety.

TECHNICAL FIELD

This invention relates to electrode materials useful in secondary lithium batteries.

BACKGROUND OF THE INVENTION

Two classes of materials have been proposed as anodes for secondary lithium batteries. One class includes materials such as graphite and other forms of carbon, which are capable of intercalating lithium. While the intercalation anodes generally exhibit good cycle life and coulombic efficiency, their capacity is relatively low.

A second class includes metals that alloy with lithium metal. Although these alloy-type anodes generally exhibit higher capacities relative to intercalation-type anodes, they suffer from relatively poor cycle life and coulombic efficiency. One reason is that the alloy-type anodes undergo large volume changes during charge and discharge. This results in the deterioration of contact between the active particles and conductive diluent (e.g., carbon) particles typically combined with the active particles to form the anode. The deterioration of contact, in turn, results in diminished cycling rate behavior.

SUMMARY OF THE INVENTION

The invention provides electrode compositions suitable for use in secondary lithium batteries in which the electrode compositions have high initial capacities that are retained even after repeated cycling. The electrode compositions, and batteries incorporating these compositions, are also readily manufactured.

To achieve these objectives, the invention features an electrode composition that includes a plurality of composite particles admixed with a plurality of electrically conductive diluent particles (e.g., electrically conductive carbon particles). The composition may further include a polymeric binder (e.g., a polyvinylidene fluoride binder) in which the composite particles and diluent particles are dispersed.

The composite particles include an electrochemically active metal particle and an electrically conductive layer partially covering the metal particle. In one aspect, the layer is present in an amount no greater than about 75 wt. % of the composite particle. Preferably, the layer is present in an amount no greater than about 50 wt. % of the composite particle, and may be present in an amount no greater than about 25 wt. % of the composite particle. In a second aspect, the layer is present in an amount no greater than about 75 vol. % of the composite particle, and may be present in an amount no greater than about 50 vol. % or 25 vol. % of the composite particle. The layer improves the efficiency of the electrode by reducing the deterioration of electrical contact between the electrochemically active metal particles and the electrically conductive diluent particles during cycling.

An "electrochemically active metal" is a metal that reacts with lithium under conditions typically encountered during charging and discharging in a lithium battery. In contrast, an "electrochemically inactive elemental metal" is a metal that does not react with lithium under those conditions. In both cases, the term "metal" includes materials such as silicon that are sometimes referred to as "metalloids."

An "electrically conductive layer" is a layer having a bulk electrical conductivity at least in the semi-conducting range, e.g., on the order of about $10^{-6}$ ohm$^{-1}$ cm$^{-1}$ or greater.

The expression "partially covering" means that the layer, when the composite particle is contacted with an electrolyte that includes a lithium electrolyte salt, allows the electrolyte to access the underlying electrochemically active metal particle. In some cases, this involves an arrangement in which the layer is in the form of a discontinuous coating on the particle such that the underlying metal particle material is detectable using x-ray photoelectron spectroscopy (XPS). In other cases, the layer may be porous to enable the electrolyte to penetrate the layer and access the underlying metal particle. The percent porosity of the layer is determined according to the procedure set forth in the Examples, below. Preferably, the layer has a porosity on the order of about 90%.

When incorporated in a lithium battery, the electrode composition preferably exhibits (a) a specific capacity of at least about 100 mAh/ per gram of active metal for 30 full charge-discharge cycles and (b) a coulombic efficiency of at least 99% (preferably at least 99.5%, more preferably at least 99.9%) for 30 fall charge-discharge cycles when cycled to realize about 100 mAh/per gram of active metal of the composition. Preferably, this level of performance is realized for 500 cycles, more preferably for 1000 cycles.

In another preferred embodiment, the electrode composition, when incorporated in a lithium battery, exhibits (a) a specific capacity of at least about 500 mAh per gram of active metal for 30 full charge-discharge cycles and (b) a coulombic efficiency of at least 99% (preferably at least 99.5%, more preferably at least 99.9%) for 30 full charge-discharge cycles when cycled to realize about 500 mAh per gram of active metal of the composition. Preferably, this level of performance is realized for 200 cycles, more preferably for 500 cycles.

Examples of suitable metals for the electrochemically active metal particle include aluminum, silicon (e.g., amorphous silicon), tin, antimony, lead, germanium, magnesium, zinc, cadmium, bismuth, and indium. The particle may also include one or more electrochemically inactive elemental metals. Examples of suitable electrochemically inactive elemental metals include Group IB through Group VIIB elemental metals, as well as group VIII and rare earth elemental metals. Specific examples include Ti, V, Cr, Mn, Fe, Co, Ni, Cu, Y, Zr, Nb, Mo, La, Hf, Ta, W, Ce, Pr, Nd, Eu, Gd, Tb, Dy, Ho, Er, Yb, Lu, Be, and Sm. Of this group, molybdenum, niobium, tungsten, tantalum, iron, nickel, manganese, and copper are preferred.

In one embodiment, the metal particle consists essentially of at least one electrochemically inactive elemental metal and at least one electrochemically active elemental metal in the form of an amorphous mixture at ambient temperature. For example, the mixture may consist essentially of silicon, tin, and copper. The mixture remains amorphous when the electrode composition is incorporated into a lithium battery and is cycled through at least one full charge-discharge cycle at ambient temperature. An "amorphous" material is a material that lacks the long range atomic order characteristic of crystalline material, as observed by x-ray diffraction, transmission electron microscopy or differential scanning calorimetry.

The electrically conductive layer may take a number of forms. In one embodiment, the layer includes electrically conductive carbon particles dispersed in a polymeric binder (e.g., a polyvinylidene fluoride binder). In other embodiments, the layer is a metal layer such as a silver, copper, or chromium layer. In a particularly preferred embodiment, the composite particles feature a layer of electrically conductive carbon particles dispersed in a polyvinylidene binder partially covering the active metal particle, and the electrode composition is prepared by combining the composite particles with electrically conductive carbon diluent particles in a second polyvinylidene fluoride binder.

Lithium batteries including the above-described electrode compositions may be used as power supplies in a variety of applications. Examples include power supplies for motor vehicles, computers, power tools, and telecommunications devices.

Other features and advantages of the invention will be apparent from the following description of the preferred embodiments thereof, and from the claims.

DESCRIPTION OF DRAWINGS

Like reference symbols in the various drawings indicate like elements.

DETAILED DESCRIPTION

Figure 1A:
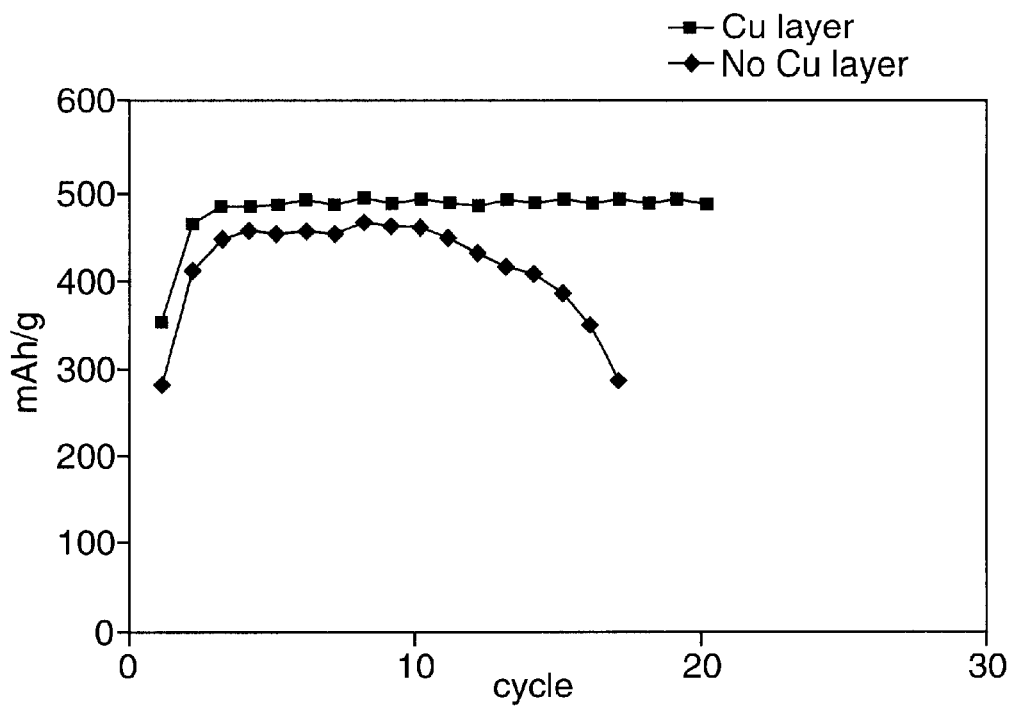
FIG. 1A illustrates the cycling performance, in terms of reversible specific capacity, of electrodes with and without electrically conductive layers, as described in Example 1.

The electrode compositions include composite particles admixed with an electrically conductive diluent such as carbon black. The composition may further include a polymeric binder such as polyvinylidene fluoride in which the composite particles and diluent particles are dispersed. The composite particles have the chemical composition and microstructure described in the Summary of the Invention, above. They may be prepared in the form of thin films using techniques such as chemical and vapor deposition, vacuum deposition (i.e., sputtering), vacuum evaporation, melt spinning, splat cooling, spray atomization, electrochemical deposition (e.g., electroless plating), and the like, and then pulverized. Alternatively the layer may be placed on the particles after pulverizing by any of these same methods. They may also be prepared using techniques such as ball milling or chemical reduction of the active metal.

The electrode compositions are particularly useful in lithium ion batteries. To prepare a battery, the composite particles and electrically conductive diluent are combined with a binder (e.g., a polyvinylidene fluoride binder) and solvent to form a slurry which is then coated onto a backing using conventional coating techniques and dried to form the electrode. The electrode is then combined with an electrolyte and a counterelectrode.

The electrolyte may be a solid or liquid electrolyte. Examples of solid electrolytes include polymeric electrolytes such as polyethylene oxide, polytetrafluoroethylene, fluorine-containing copolymers, and combinations thereof. Examples of liquid electrolytes include ethylene carbonate, diethyl carbonate, propylene carbonate, and combinations thereof. The electrolyte is provided with a lithium electrolyte salt. Examples of suitable salts include $LiPF_6$, $LiBF_4$, and $LiClO_4$.

Examples of suitable counterelectrode compositions for liquid electrolyte-containing batteries include $LiCoO_2$, $LiCo_{0.2}Ni_{0.8}O_2$, and $LiMn_2O_4$. Examples of suitable counterelectrode compositions for solid electrolyte-containing batteries include $LiV_3O_8$ and $LiV_2O_5$.

The invention will now be described further by way of the following examples.

EXAMPLES

A. Electrode Preparation Electrodes were prepared in the form of thin films either by sputtering according to the following procedures.

Sputtering Procedure #1

Thin films were prepared by sequential or single target sputtering using a modified Perkin-Elmer Randex Model 2400-8SA Sputtering System. The original 8 inch diameter of sputter sources were replaced with 6 inch diameter dc magnetron sputtering sources commercially available from Materials Science of San Diego Calif. The sputtering sources were powered using Advanced Energy Model MDX-10 dc sputtering power supplies operating in constant current mode. The turntable drive unit of the Randex System was replaced with a stepper motor to improve rotation speed range and control. The System was pumped with an untrapped oil diffusion pump backed by a conventional rotary vane pump.

Sputtering was performed at argon pressures in the range of 3–30 mTorr. The pressure was maintained by controlling the argon flow in combination with a venetian blind-style conductance limiter placed over the diffusion pump.

A copper foil (thickness=0.001 inch) was bonded to the water-cooled substrate turntable of the Randex System using double sided adhesive tape (3M Brand Y9415, commercially available from 3M Company of St. Paul, Minn.). The system was closed and pumped down, typically to base pressures below $1 \times 10^{-5}$ Torr (the base pressure prior to deposition is not critical). The samples were etched prior to deposition using the "Sputter Etch" mode of the Randex System with 13.56 MHz power applied to the substrate turntable and an argon pressure of 8 mTorr in the sputtering chamber. This procedure caused the copper foil surface to be bombarded with moderate energy argon ions (100–150 eV) to further clean the copper and insure good adhesion of the sputtered film to the copper surface. A typical cleaning cycle was 150W for 30 minutes, with the substrate table rotating during the cycle.

Following etching, the sputtering sources were started up using a mechanical shutter between the sources and the copper substrate. This removed contaminants from the source surface without depositing them on the substrate surface. Next, both sources were started up at predetermined current levels and deposition initiated. After a suitable deposition time, one or both sources were turned off.

Sputtering Procedure #2

Films were prepared using a sputtering coater consisting of a conventional web handling system driving a 6 inch wide web over a water-cooled chill roll opposing three 6 inch long water-cooled sputtering targets. A multitude of water-cooled shields confined the sputtering plasma and defined the exposed area of the moving web. The coater was evacuated using a CTI-CRYOGENICS ON-BORD® high vacuum cryo pump and a Leybold high vacuum turbo pump model 220 backed by a conventional roughing pump. The targets were powered by an ADVANCED ENERGY MDX II dc power supply operated in constant power mode. Sputtering was performed at 30mTorr in an argon atmosphere. Adjusting the sputtering power and the web speed controlled the amount of deposited material (coating weight).

Sputtering Procedure #3

Thin films were prepared using individual sputtering targets in a P4 Mill Lane Sputtering System. The sputtering sources were powered using Advanced Energy Model MDX-10 dc sputtering power supplies operating in constant power mode. The system was pumped using six CTI-CRYOGENICS ON-BORD® high vacuum cryo pumps (one 10 in. pump and five 8 in. pumps). A copper foil (thickness=0.001 inch) was taped to the 24 inch chilled roll of the sputtering system. The system was closed and pumped down, typically to base pressures below $3 \times 10^{-6}$ Torr. Next, both sources were started up with a 2 minute power ramp to the final power level and deposition initiated. After a suitable deposition time, the silicon was turned off, and a copper or chromium target was turned on to create a top coat.

B. X-Ray Diffraction

Diffraction patterns were collected using a Siemens Model Kristalloflex 805 D500 diffractometer equipped with a molybdenum target x-ray tube and a diffracted beam monochromator. Samples were mounted on the sample holder.

C. Porosity

Porosity is defined in the following equations:

$$P = \frac{V_{pores}}{V_{obs}} = \frac{V_{obs} - V_{ideal}}{V_{obs}} = \frac{\frac{m_{obs}}{\rho_{obs}} - \frac{m_{ideal}}{\rho_{ideal}}}{\frac{m_{observed}}{\rho_{observed}}} = \frac{\rho_{obs}^{-1} - \rho_{ideal}^{-1}}{\rho_{obs}^{-1}}$$

where P is the calculated porosity, V refers to the volume, the subscripts for V indicate which volume is referred to among the volume of the pores, the observed volume, obs, and the ideal volume. Volume may be calculated by dividing the mass m of a given component i by its density r. The masses of interest, obs and ideal, are equivalent; thus the porosity can be calculated from the observed and ideal densities alone. The ideal and observed densities are arrived at two different ways. The ideal is calculated as follows:

$$\rho_{ideal} = m_T / V_T = m_T \Big/ \sum_i \frac{m_i}{\rho_i} = \left[ \sum_r \frac{w_i}{\rho_i} \right]^{-1}$$

where T refers to the ideal, total, non-porous layer containing i parts, and Wi refers to the weight percent of the total layer due to a given part i. The weight percent of each part of the layer is known when the layer is produced. The density of each part is that supplied by the manufacturer or determined experimentally, and assumes zero porosity of the ideal part. The observed density is calculated as follows:

Pobs=$^m$Tobs|$^V$Tobs=$^m$Tobs|[$^A$Tobs$^t$Tobs]

where $t_{obs}$ refers to the observed values for the total porous layer, A refers to the area, and t refers to the thickness. The masses of a set of large area layers are averaged. The thickness is an average of a set measured with a micrometer.

D. Electroless Plating Procedure

The following procedure produces an electrode having a 20% by weight silver plating on the core. Platings having different silver levels are prepared by varying the amount of plating reagent used.

A plating reagent was prepared by dissolving 0.26 grams of KOH in 100 ml of deionized water, followed by the addition of 1.32 ml of ammonium hydroxide and 0.59 grams of silver nitrate ($AgNO_3$). The combination of the silver nitrate and the ammoniumn hydroxide forms the active compound $Ag(NH_3)_2$ from which the silver is plated after the addition of a reducing sugar.

A 0.5 gram sample of the core material in the form of particles was placed in a vial with a 26 ml aliquot of the silver nitrate solution and stirred at a speed sufficient to keep the particulate material from settling out. The amount of reagent was selected to produce a plating having 20% silver by weight. The plating process was initiated by rapidly adding 6.6 mls of a 25 g/liter solution of dextrose to the swirling vortex of the stirred solution in order to disperse the reducing sugar quickly. The plating reaction started immediately and was allowed to progress at least 30 minutes under rapid agitation, after which a centrifuge was used to separate the particulate matter. The remaining spent solution was decanted away. After several water washes in the centrifuge, the plated material was allowed to dry in an oven at approximately 70° C. overnight. The resulting material was easily powdered and displayed a color change indicating a successful plating operation.

We now describe the preparation and characterization of specific electrode samples.

Example 1

A single target of aluminum-silicon (64 wt. % aluminum and 36 wt. % silicon) was sputtered onto a cleaned, cooled, 1 mil, fully annealed, cold rolled 110 copper backing (Alifoils, Brooklyn Hts., Ohio). Sputtering was accomplished following Sputtering Procedure #1 under 12 mTorr of argon using a substrate rotation rate of 38 rpm and a rate of 24 angstroms/kWmin. The power was 8 kW and the total sputtering time was 4 hours. The sputter-deposited film had a thickness of 4.5 microns and exhibited poor adhesion to the copper substrate.

Next, a layer of copper having a thickness of 1.2 microns was sputter-deposited onto half of the sputter-deposited aluminum-silicon film. Sputtering was accomplished under 12 mTorr of argon using a substrate rotation rate of 38 rpm and a rate of 200 angstroms/kWmin. The power was 2 kW and the total sputtering time was 0.5 hours. Aluminum-silicon films with and without the copper overlayer were then separately peeled off the thick copper backing and converted into flake by pulverizing each film using a mortar and pestle.

A 110% solids dispersion was prepared by combining 2.4 g of each pulverized film with 0.26 g of polyvinylidene fluoride binder and 0.14 g of Super S conductive carbon in N-methyl-2-pyrrolidinone. Each dispersion was then milled with ceramic media in a roller mill overnight at 100 rpm, followed by coating onto a copper foil and drying under vacuum for several hours to remove residual solvent. The resulting coated samples were then used to construct 1225 coin cells using a lithium foil (about 300 micrometers thick, available from Aldrich Chemical Co. of Milwaukee, Wis.) as the counterelectrode. The cell was constructed using a 50 micrometer thick polyethylene separator. The electrolyte was 1 molar $LiPF_6$ in a 1:1 v/v mixture of ethylene carbonate and diethyl carbonate. Copper spacers were used as current collectors and to fill void areas in the cell.

Figure 1B:
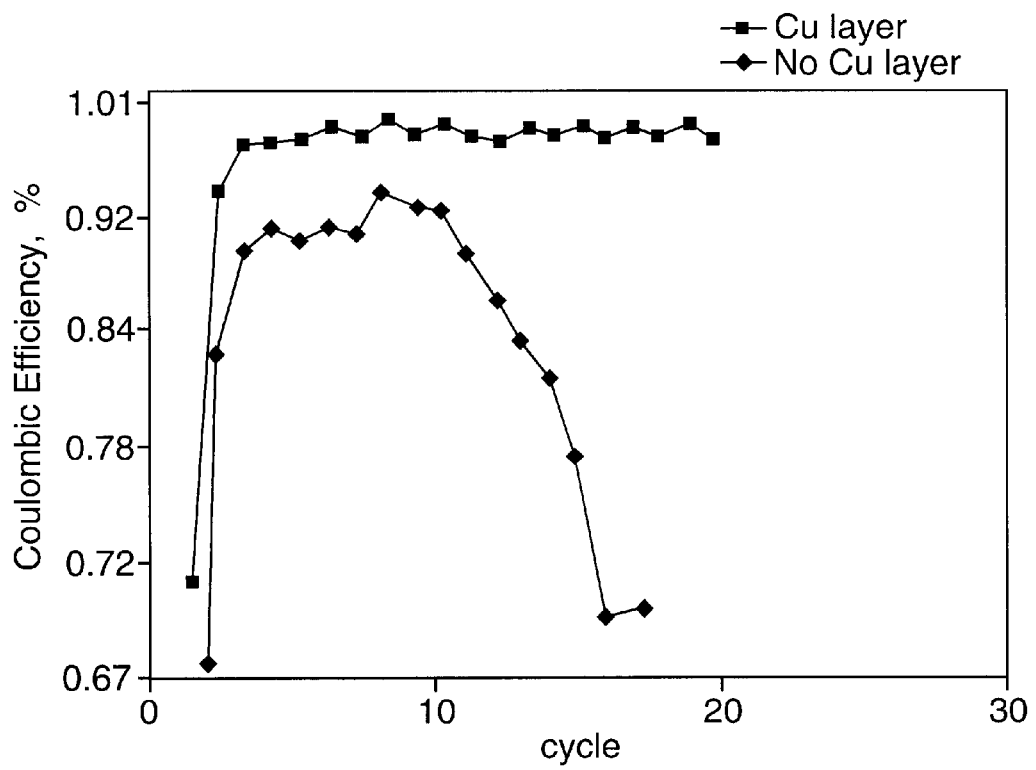
FIG. 1B illustrates the cycling performance, in terms of coulombic efficiency, of electrodes with and without electrically conductive layers, as described in Example 1.

The electrochemical performance of the cell was measured using a MACCOR cycler. Cycling was done by constant current charge and discharge between 1.0 V and 0.0 V. The reversible specific capacity and coulombic efficiency of the cell are shown in FIGS. 1A and 1B, respectively. The results demonstrate that the electrodes having an electrically conductive copper layer partially covering the active aluminum-silicon particle exhibit superior coulombic efficiency and cycling performance relative to electrodes featuring aluminum-silicon particles that lack such a layer.

Example 2

A film containing 30 wt. % silicon, 66 wt. % tin, and 4 wt. % copper was prepared by sputter deposition according to Sputtering Procedure #2 described above using 11 kW total power for the three individual targets. The sputtering was conducted under 30 mTorr of argon using a web speed of 0.24 ft/min. Three targets of identical silicon/tin/copper composition were sputter deposited at a rate of about 3 grams/kwh. A 10 micron thick copper foil (Japan) was used as the backing. The sputter deposited film had a thickness of about 5 microns and a density of about 4 g/cm$^3$. The film was scraped from the copper foil using a razor blade, pulverized, and sieved using a 270-mesh sieve (U.S. standard sieve size; ASTM E-11-61).

The resulting powder was used to construct a 2325 coin cell for cycling experiments. A dispersion was prepared having 50 wt. % of the powder, 32 wt. % Super-P carbon (MMM Carbon, Belgium), and 18 wt. % polyvinylidene fluoride binder in N-methyl-2-pyrrolidinone. The dispersion was then coated onto a second copper foil and dried under vacuum for several hours to remove residual solvent. The resulting coated foil was used to construct the 2325 coin cell using a lithium foil (about 300 micrometers thick, available from Aldrich Chemical Co. of Milwaukee, Wis.) as the counterelectrode. The cell was constructed using a 50 micrometer thick polyethylene separator. The electrolyte was 1 molal $LiPF_6$ in a 1:1 v/v mixture of ethylene carbonate and diethyl carbonate. Copper spacers were used as current collectors and to fill void areas in the cell.

The electrochemical performance of the cell, in terms of trickle charge capacity and charge rest voltage, was measured using a MACCOR cycler. The cell was first discharged at a high rate of 350 mA/g to a fixed capacity of 700 mAh/g to lithiate the electrode. The cell was then charged at a rate of 350 mA/g to a voltage of 1.2 V to extract lithium from the electrode. Next, the cell was allowed to rest (zero current) for 15 minutes, after which the cell voltage may drop below 1.0 V. The potential at the end of this rest period was recorded as the "charge rest voltage." It provides a measure of the amount of lithium remaining in the electrode. In general, the higher the charge rest voltage and the more stable it is versus cycle number, the more effectively lithium is being removed.

Figure 3:
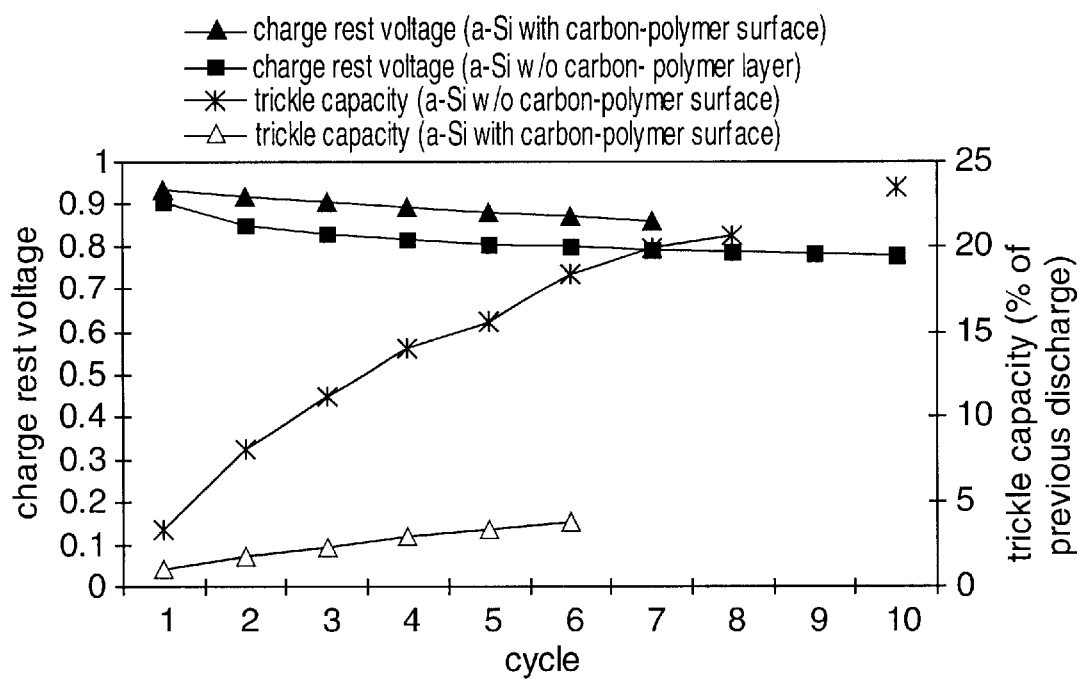
FIG. 3 illustrates the cycling performance of the silicon-tin-copper sample and the silicon-tin-copper sample having an electrically conductive layer described in Example 2 in terms of charge rest voltage and trickle capacity.

At the end of the rest period, the cell was charged at a low rate ("trickle charge") of 35 mA/g to 1.2 V to remove any lithium not removed at the higher rate (350 mA/g). The trickle charge capacity is a measure of the extent of lithium removal and is thus analogous to coulombic efficiency. In general, the more lithium removed during application of the trickle charge, the less effective the electrode is at giving up lithium during the high rate charge. Accordingly, it is desirable to minimize the trickle charge capacity for a given cycle, and to maintain a low trickle charge capacity after repeated cycling. The results for the silicon-tin-copper sample are shown in FIG. 3.

Next, the above-described procedure was repeated except that prior to sputtering, the copper foil was solution coated prior to sputtering with a binder prepared from 40 wt. % Super-P carbon and 60 wt. % polyvinylidene fluoride in N-methyl-2-pyrrolidinone. The binder was coated onto the foil using an 8 mil notch bar, and then dried under vacuum at 60° C. for four hours to remove solvent. The dried binder thickness was about 8 microns and the sputtered film thickness was 5 microns. The volume % of the binder layer in the composite, therefore, is 60%. The binder layer had a porosity of 90%, determined according to the procedure described above. The combined binder/sputtered film composite contained 87 wt. % silicon-tin-copper film and 13 wt. % binder.

Figure 2:
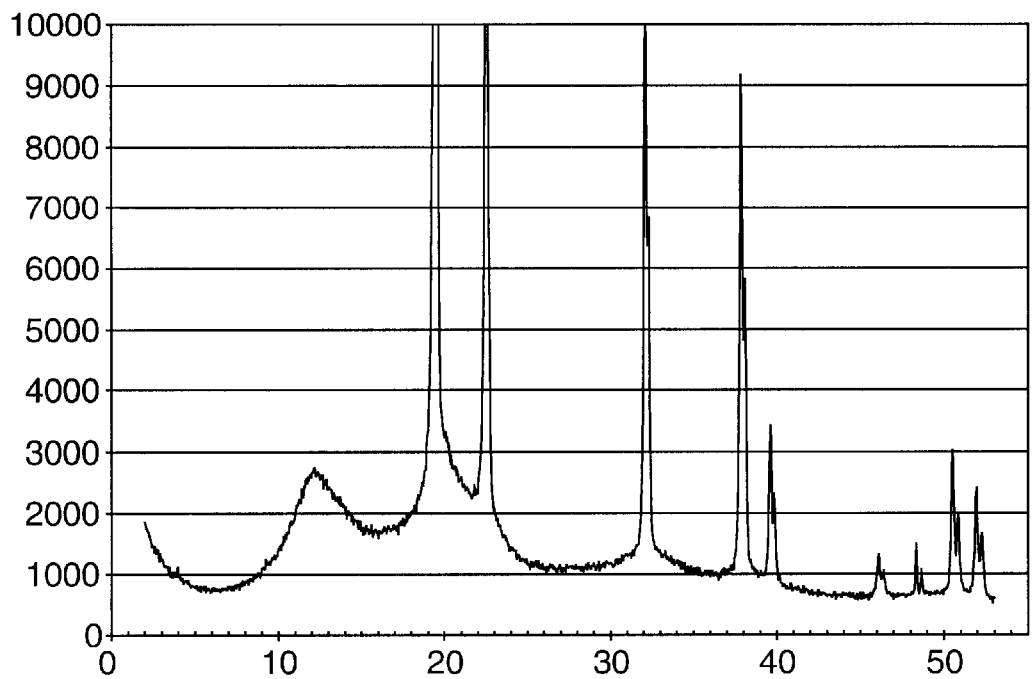
FIG. 2 is an x-ray diffraction profile for the silicon-tin-copper sample having an electrically conductive layer described in Example 2, obtained prior to cycling.

The x-ray diffraction profile of the sample is set forth in FIG. 2. It is characterized by the absence of crystalline tin and silicon. The large peaks are due to the copper foil current collector.

The composite was removed from the copper backing using acetone, followed by scraping it from the copper foil. The scraped material was pulverized, sieved, combined with a carbon-containing binder layer, and coated onto a second copper foil to form an electrode as described above. The final dried coating contained 50 wt. % active silicon-tin-copper particles, 32 wt. % Super-P carbon, and 18 wt. % polyvinylidene fluoride, where the amounts of Super-P carbon and polyvinylidene fluoride represent the sum total of these materials in both the layer on the silicon-tin-copper particles and the dispersion used to form the final electrode.

The electrode was used to construct a 2325 coin cell and tested as described above. The cycling results, terms of trickle charge capacity and charge rest voltage, are shown in FIG. 3, alongside the results of the same material prepared without the electrically conductive layer. The sample prepared with the electrically conductive layer exhibited a higher charge rest voltage and lower trickle charge capacity over a number of cycles, demonstrating that partially covering the silicon-tin-copper particle with an electrically conductive layer of carbon dispersed in polyvinylidene fluoride improves the charge efficiency of the electrode.

Example 3

A copper foil was coated with binder as described in Example 2. Next, a film containing 100 wt. % amorphous silicon was sputter deposited on the dried binder following Sputtering Procedure #3. Sputtering was accomplished under 13 mTorr of argon using a substrate rotation rate of 3.8 rpm and a rate of 40.10 angstroms/kWmin. The power was 5.2 kW and the total sputtering time was 3 hours and 48 minutes. The sputter deposited film had a thickness of 4.8 microns. The binder thickness was 8 microns. Accordingly, the amount of binder relative to the total composite (i.e., sputtered film plus binder) was about 25% by weight and about 60% by volume. The composition of the sputtered film was determined by inductively coupled plasma using a Perkin Elmer Optima 3300 DV.

After sputtering, the composite (sputter deposited silicon film plus binder) was removed from the copper foil using acetone, followed by scraping it from the foil. The scraped material was pulverized and sieved to form a powder.

Figure 4:
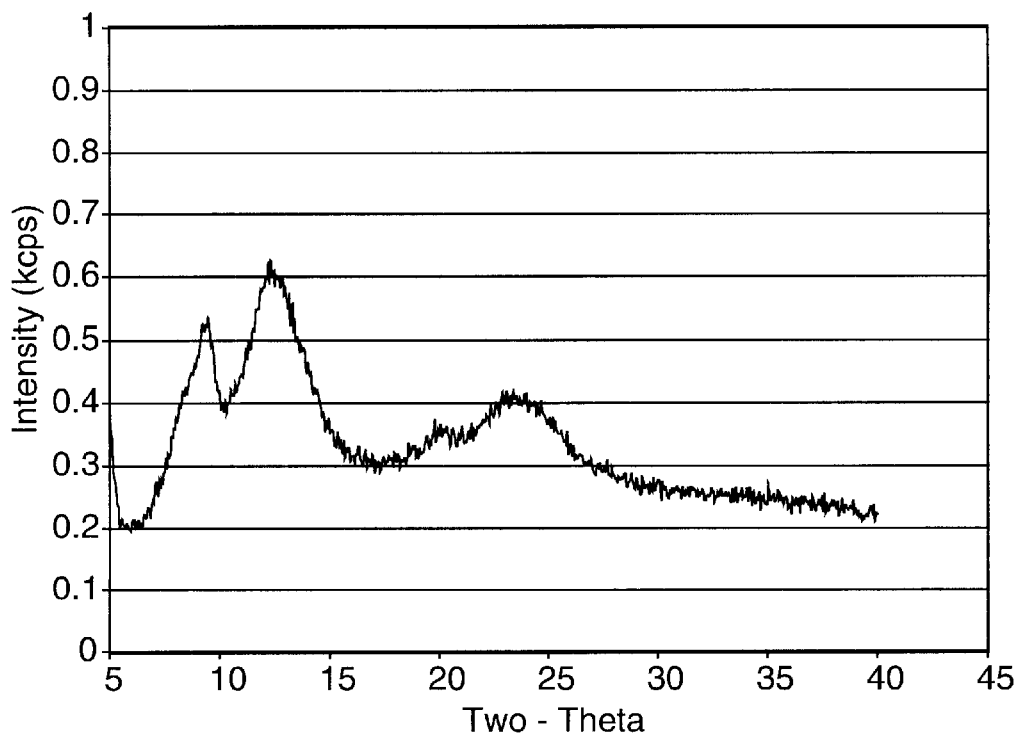
FIG. 4 is an x-ray diffraction profile for the silicon sample having an electrically conductive layer described in Example 3, obtained prior to cycling.

The x-ray diffraction pattern of the powder is shown in FIG. 4. It is characterized by the absence of crystalline silicon.

Figure 5:
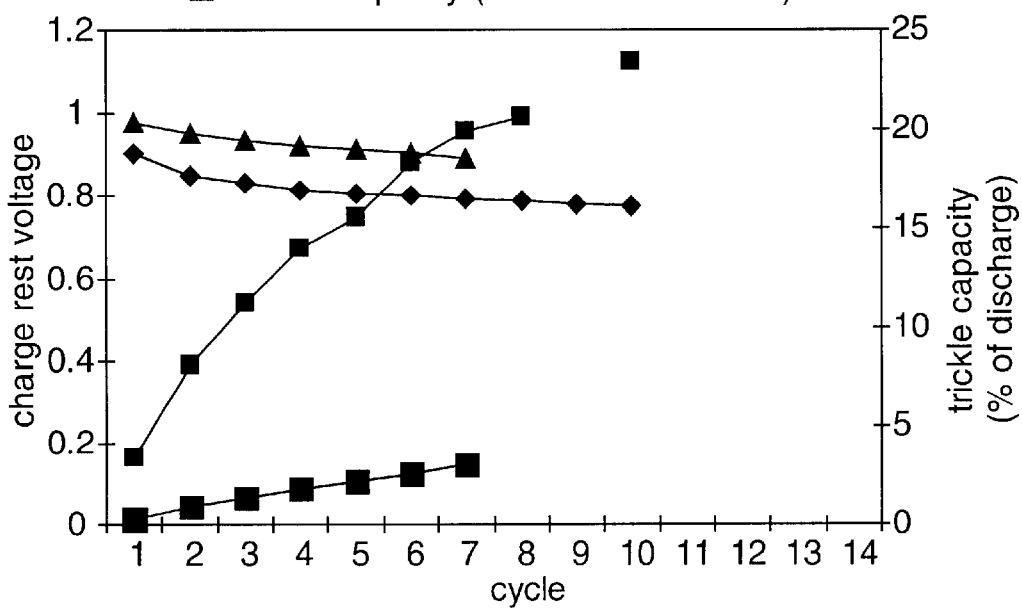
FIG. 5 illustrates the cycling performance of the silicon sample and the silicon sample having an electrically conductive layer described in Example 3 in terms of charge rest voltage and trickle capacity.

The powder was combined with a binder and coated onto a second copper foil to form an electrode following the procedure of Example 2. The final dried coating contained 50 wt. % amorphous silicon, 35 wt. % Super-P carbon, and 15 wt. % polyvinylidene fluoride, where the amounts of Super-P carbon and polyvinylidene fluoride represent the sum total of these materials in both the layer on the silicon-tin-copper particles and the dispersion used to form the final electrode. The electrode was used to construct a 2325 coin cell and tested as described in Example 2 with the exception that the cell was discharged to a fixed capacity of 1400 mAh/g, rather than 700 mAh/g, to lithiate the electrode. The cycling results, terms of trickle charge capacity and charge rest voltage, are shown in FIG. 5.

For the sake of comparison, an electrode was prepared by combining 0.5 grams of amorphous silicon (Iowa Thin Films, Ames, 1A) with a binder containing 30 wt. % polyvinylidene fluoride and 70 wt. % Super P carbon in N-methyl-2-pyrrolidinone to form a dispersion. The dispersion was coated on a copper foil backing (0.5 mil) using a 20 mil knife coater, and dried under vacuum for 4 hours. The final dried coating contained 50 wt. % amorphous silicon, 35 wt. % Super P carbon, and 15 wt. % polyvinylidene fluoride. A 2325 coin cell was then assembled and tested following the procedure described above. The results, in terms of trickle charge capacity and charge rest voltage, are shown in FIG. 5. The sample prepared with the electrically conductive layer of carbon dispersed in polyvinylidene fluoride exhibited a higher charge rest voltage and lower trickle charge capacity over a number of cycles, demonstrating that partially covering the amorphous silicon core with the electrically conductive layer improves the charge efficiency of the electrode.

Example 4

A layered film containing 82.0 wt. % amorphous silicon and 18.0 wt. % chromium was prepared by sputter deposition following Sputtering Procedure #3 using a silicon target and a chromium target. The silicon was sputtered under 13 mTorr of argon onto a copper foil using a substrate rotation rate of 3.8 rpm and a rate of 40.10 angstroms/kWmin. The power was 5.5 kW and the total sputtering time was 2 hours. The sputter deposited silicon film had a thickness of 2.65 microns.

The chromium was sputtered onto the silicon film under 3 mTorr of argon using a substrate rotation rate of 3.8 rpm and a rate of 55 angstroms/kWmin. The power was 5.5 kW and the total sputtering time was 10 minutes. The sputter deposited chromium film had a thickness of 0.3 microns. The amount of chromium, therefore, was 10% by volume of the composite film. The composition of the sputtered composite film was determined by inductively coupled plasma using a Perkin Elmer Optima 3300 DV.

Figure 6:
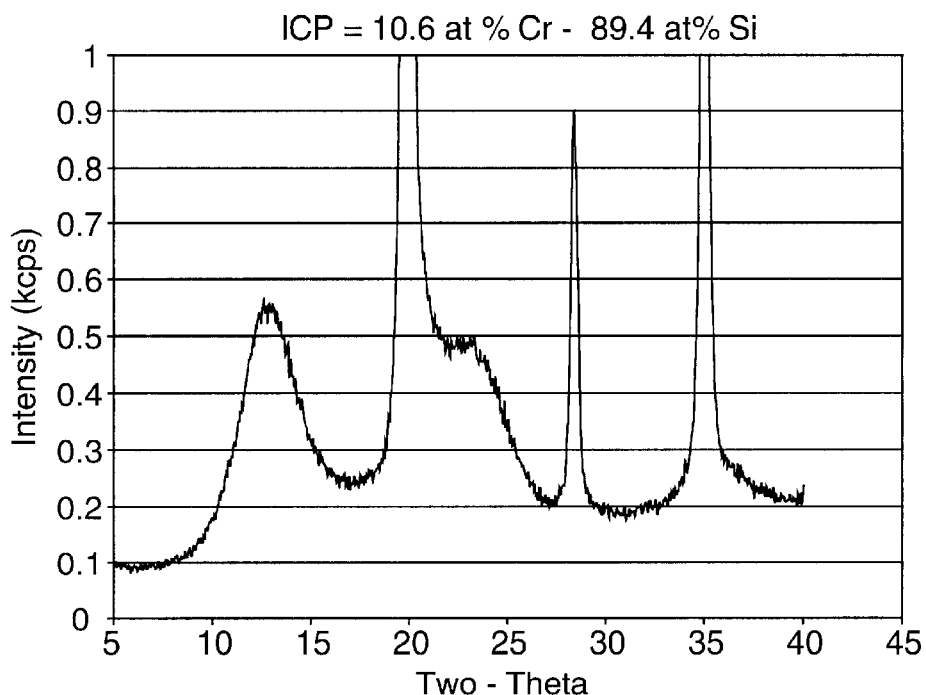
FIG. 6 is an x-ray diffraction profile for the silicon sample having an electrically conductive layer described in Example 4, obtained prior to cycling.

After sputtering, the composite film was removed from the copper foil by scraping it from the foil. The scraped material was pulverized and sieved to form a powder. The x-ray diffraction pattern of the powder is shown in FIG. 6. It is characterized by the absence of crystalline silicon. The sharp peaks are due only to chromium.

Figure 7:
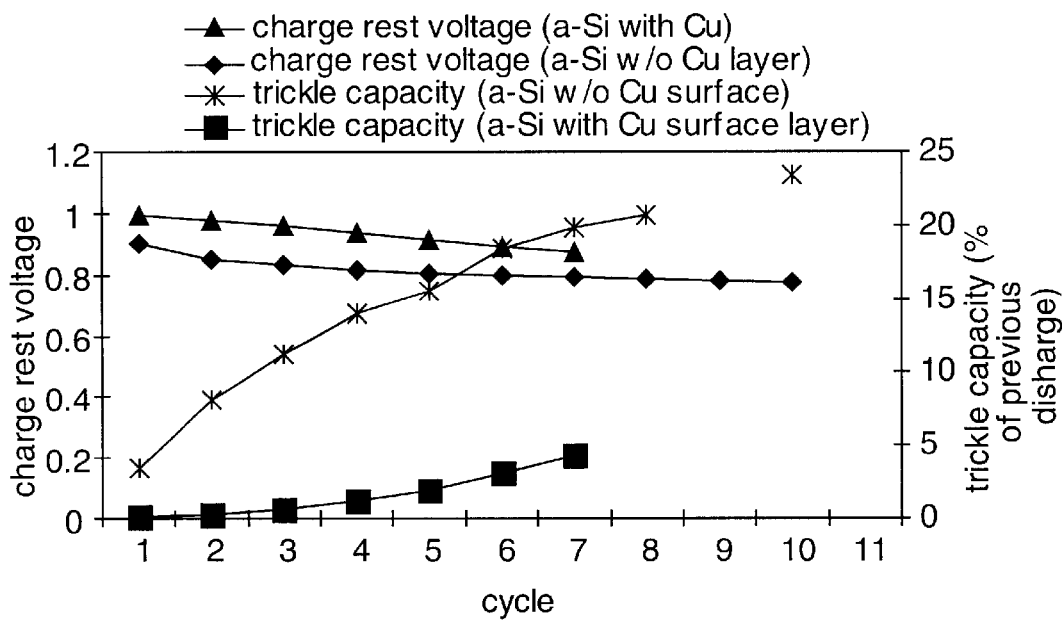
FIG. 7 illustrates the cycling performance of the silicon sample and the silicon sample having an electrically conductive layer described in Example 4 in terms of charge rest voltage and trickle capacity.

The powder was combined with a binder and coated onto a second copper foil to form an electrode following the procedure of Example 2. The final dried coating contained 50 wt. % silicon-chromium, 35 wt. % Super-P carbon, and 15 wt. % polyvinylidene fluoride. The electrode was used to construct a 2325 coin cell and tested as described in Example 2 with the exception that the cell was discharged to a fixed capacity of 1400 mAh/g, rather than 700 nmAh/g, to lithiate the electrode. The cycling results, terms of trickle charge capacity and charge rest voltage, are shown in FIG. 7, along with results for the amorphous silicon electrode prepared as described in Example 3 for the sake of comparison. The sample prepared with the chromium layer exhibited a higher charge rest voltage and lower trickle charge capacity over a number of cycles, demonstrating that partially covering the amorphous silicon particles with an electrically conductive layer of chromium improves the charge efficiency of the electrode.

Example 5

A layered film containing 75.3 wt. % amorphous silicon and 24.7 wt. % copper was prepared by sputter deposition following Sputtering Procedure #3 using a silicon target and a copper target. The silicon was sputtered under 13 mTorr of argon onto a copper foil using a substrate rotation rate of 3.8 rpm and a rate of 40.10 angstroms/kWmin. The power was 5.5 kW and the total sputtering time was 3 hours and 2 minutes. The sputter deposited silicon film had a thickness of 4 microns.

The copper was sputtered onto the silicon film under 13 mTorr of argon using a substrate rotation rate of 3.8 rpm and a rate of 250 angstroms/kWmin. The power was 2.0 kW and the total sputtering time was 10 minutes. The sputter deposited copper film had a thickness of 5 microns. The amount of copper, therefore, was 56% by volume of the composite film. The composition of the sputtered composite film was determined by inductively coupled plasma using a Perkin Elmer Optima 3300 DV.

Figure 8:
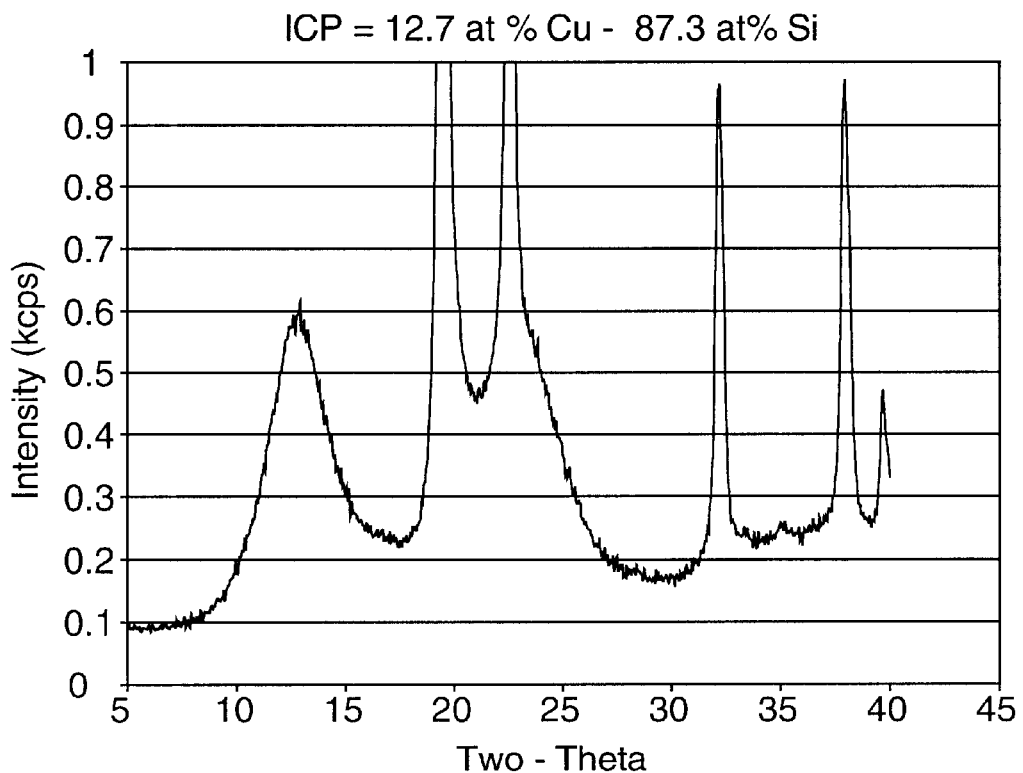
FIG. 8 is an x-ray diffraction profile for the silicon sample having an electrically conductive layer described in Example 5, obtained prior to cycling.

After sputtering, the composite film was removed from the copper foil by scraping it from the foil. The scraped material was pulverized and sieved to form a powder. The x-ray diffraction pattern of the powder is shown in FIG. 8. It is characterized by the absence of crystalline silicon.

Figure 9:
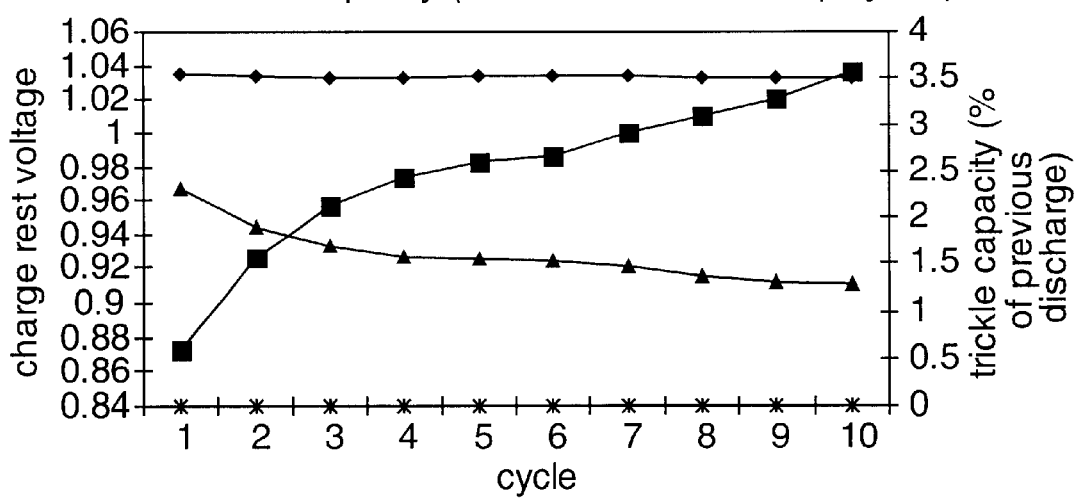
FIG. 9 illustrates the cycling performance of the silicon sample and the silicon sample having an electrically conductive layer described in Example 5 in terms of charge rest voltage and trickle capacity.

The powder was combined with a binder and coated onto a second copper foil to form an electrode following the procedure of Example 2. The final dried coating contained 50 wt. % silicon-copper, 35 wt. % Super-P carbon, and 15 wt. % polyvinylidene fluoride. The electrode was used to construct a 2325 coin cell and tested as described in Example 4. The cycling results, terms of trickle charge capacity and charge rest voltage, are shown in FIG. 9, along with results for the amorphous silicon electrode prepared as described in Example 3 for the sake of comparison. The sample prepared with the copper layer exhibited a higher charge rest voltage and lower trickle charge capacity over a number of cycles, demonstrating that partially covering the amorphous silicon particles with an electrically conductive layer of copper improves the charge efficiency of the electrode.

Example 6

Figure 10:
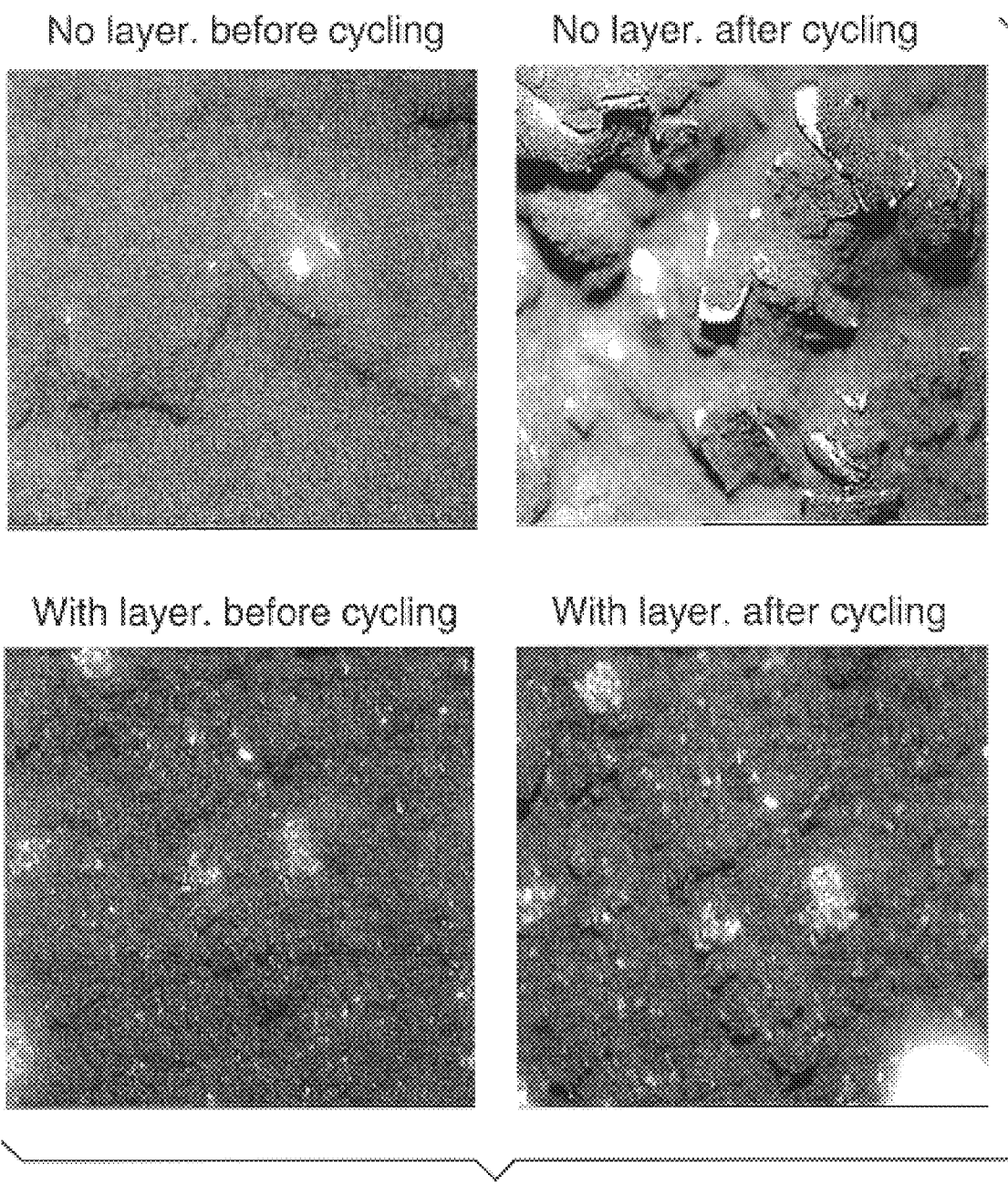
FIG. 10 is a series of optical micrographs comparing pre- and post-cycling behavior of samples prepared with and without an electrically conductive layer.

Samples were prepared both with and without an electrically conductive layer as described in Example 2. Electrodes based upon these samples were prepared and cycled at 1 mA/cm to a fixed capacity of 700 mAh/g. Optical micrographs were taken of the electrodes both before and after cycling. The results are shown in FIG. 10. The micrographs show that without the electrically conductive layer, the active metal particles push past the polyvinylidene fluoride binder easily, moving almost independently from the binder, with the result that the post-cycling micrograph looks very different from the pre-cycling micrograph. In the sample with the electrically conductive layer, however, the pre- and post-cycling micrographs are very similar, demonstrating that the particles have moved very little relative to each other because the active metal particles swell and shrink substantially uniformly upon cycling. This behavior, in turn, translates into improved electrode performance.

Example 7

A film containing 30 wt. % silicon, 66 wt. % tin, and 4 wt. % copper was prepared by sputter deposition as described in Example 2. The film was scraped from the copper foil using a razor blade, pulverized to form a powder, sieved using a mesh having 53 micron openings, and held in a sieve having 20 micron openings. The powder was then plated with various levels of silver according to the Electroless Plating Procedure described above to form a number of samples. The target amounts of silver were 5, 10, 15, and 20 wt. % on the final silver-coated silver-tin-copper powders. The actual amounts of silver, as determined by elemental analysis, were 2.5, 8.6, 12.3, and 4.5 wt. %, respectively.

Figure 11:
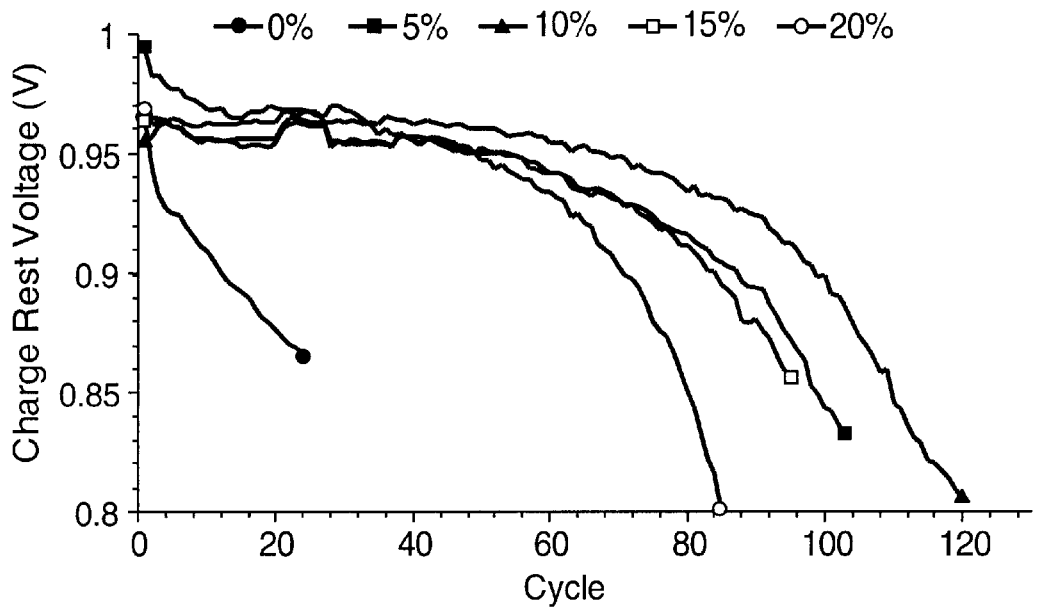
FIG. 11 illustrates the cycling performance, in terms of charge rest voltage, of samples described in Example 7 prepared with and without an electrically conductive silver layer.

Each of the resulting silver-plated samples was combined with a binder and coated onto a second copper foil to form an electrode following the procedure of Example 2. The final dried coating contained 50 wt. % amorphous silicon-tin-copper, 35 wt. % Super-P carbon, and 15 wt. % polyvinylidene fluoride. Each electrode was used to construct a 2325 coin cell and tested as described in Example 2. Each cell was discharged to 700 mAh per gram of silver-plated silicon-tin-copper, and then charged to 1.2 V, repeatedly, at a C/2 rate. The cycling results, in terms of charge rest voltage, are shown in FIG. 11, alongside results of the same material prepared without the silver layer. The results show that the silver-plated samples exhibited a higher charge rest voltage over a number of cycles, demonstrating that partially covering the silicon-tin-copper particle with an electrically conductive layer of silver improves the charge efficiency of the electrode. Preferentially the entire surface of the particle is covered with a porous silver plating.

Example 8

A film containing 30 wt. % silicon, 66 wt. % tin, and 4 wt. % copper was prepared by sputter deposition as described in Example 2. The film was scraped from the copper foil using a razor blade, pulverized to form a powder, and divided into three samples, each of which was sieved in a different way to vary the particle size of the sample. Sample (a) was sieved through a mesh having 53 micron openings and then held in a sieve having 20 micron openings. Sample (b) was sieved through a mesh having 20 micron openings and then held in a sieve having 10 micron openings. Sample (c) was sieved through a mesh having 53 micron openings. Each sample was then plated with silver according to the Electroless Plating Procedure described above to form samples having 5, 5, and 10 wt. % silver, respectively.

Figure 12:
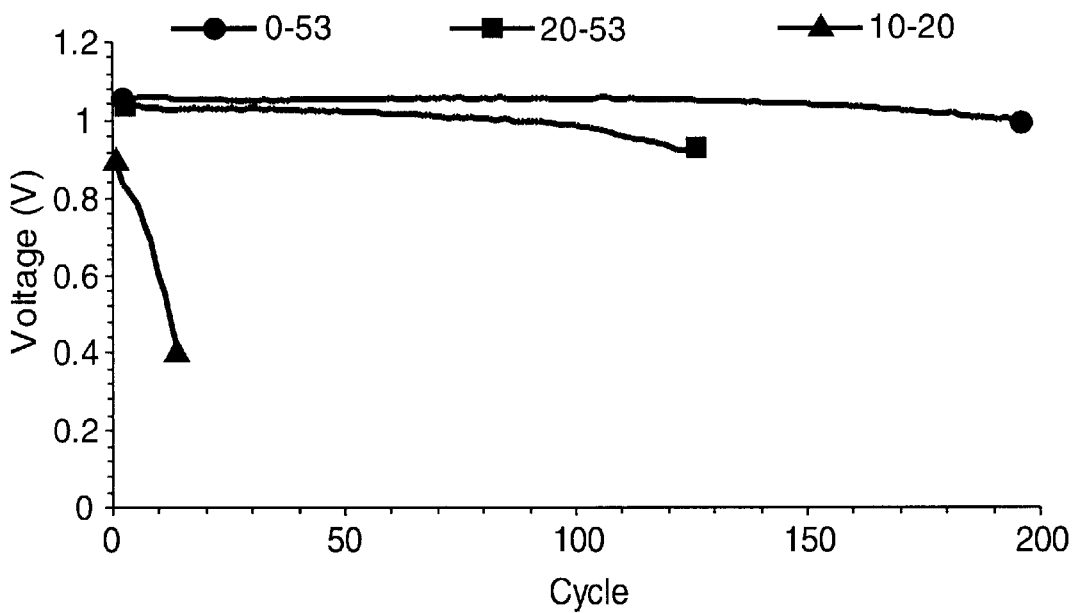
FIG. 12 illustrates the cycling performance, in terms of charge rest voltage, of samples described in Example 8 having an electrically conductive silver layer.

Each of the resulting silver-plated samples was combined with a binder and coated onto a second copper foil to form an electrode following the procedure of Example 2. The final dried coating contained 50 wt. % amorphous silicon-tin-copper, 35 wt. % Super-P carbon, and 15 wt. % polyvinylidene fluoride. Each electrode was used to construct a 2325 coin cell and tested as described in Example 2. Each cell was discharged to 700 mAh per gram of silver-plated silicon-tin-copper, and then charged to 1.2 V, repeatedly, at a C/4 rate. The cycling results, in terms of charge rest voltage, are shown in FIG. 12. The results demonstrate that partially covering the silicon-tin-copper particle with an electrically conductive layer of silver produces an electrode that exhibits good charge efficiency.

Example 9

Figure 13:
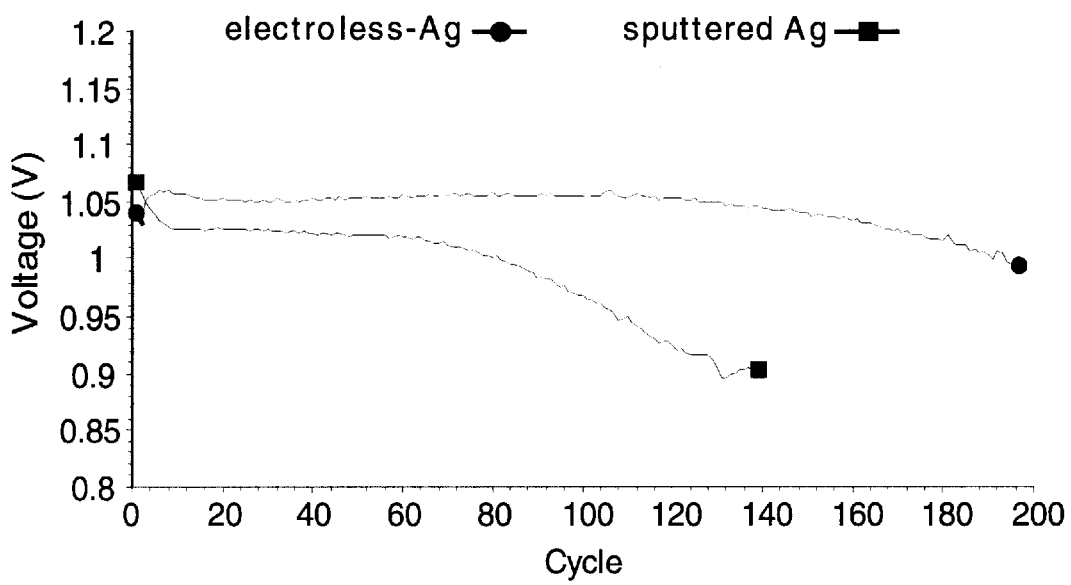
FIG. 13 illustrates the cycling performance, in terms of charge rest voltage, of samples described in Example 9 prepared with and without an electrically conductive silver layer.

A film containing 31.72 wt. % silicon, 62.20 wt. % tin, and 6.07 wt. % silver was prepared by sputter deposition following Sputtering Procedure #3. Silicon and tin were sputtered alternately to form a layered structure in which the individual layers measured no greater than 5 angstroms each. Next, a thin film of silver was sputtered onto the uppermost layer to form a layered structure having a total thickness of 8.2 microns. The film was scraped from the copper foil using a razor blade, pulverized to form a powder, sieved using a mesh having 53 micron openings, and held in a sieve having 20 micron openings. The powder was then combined with a binder and coated onto a second copper foil to form an electrode following the procedure of Example 2. The final dried coating contained 50 wt. % amorphous silicon-tin-silver, 35 wt. % Super-P carbon, and 15 wt. % polyvinylidene fluoride. The electrode was used to construct a 2325 coin cell and tested as described in Example 2. The cell was discharged to 700 mAh per gram of silicon-tin-silver, and then charged to 1.2 V, repeatedly, at a C/4 rate. The cycling results, in terms of charge rest voltage, are shown in FIG. 13, alongside results of a cell incorporating the electrode described in Example 8 having 10 wt. % electrolessly plated silver. The results show that while both electrodes result in cells having high charge efficiency, the electrolessly plated sample exhibits superior performance.

Example 10

Figure 14:
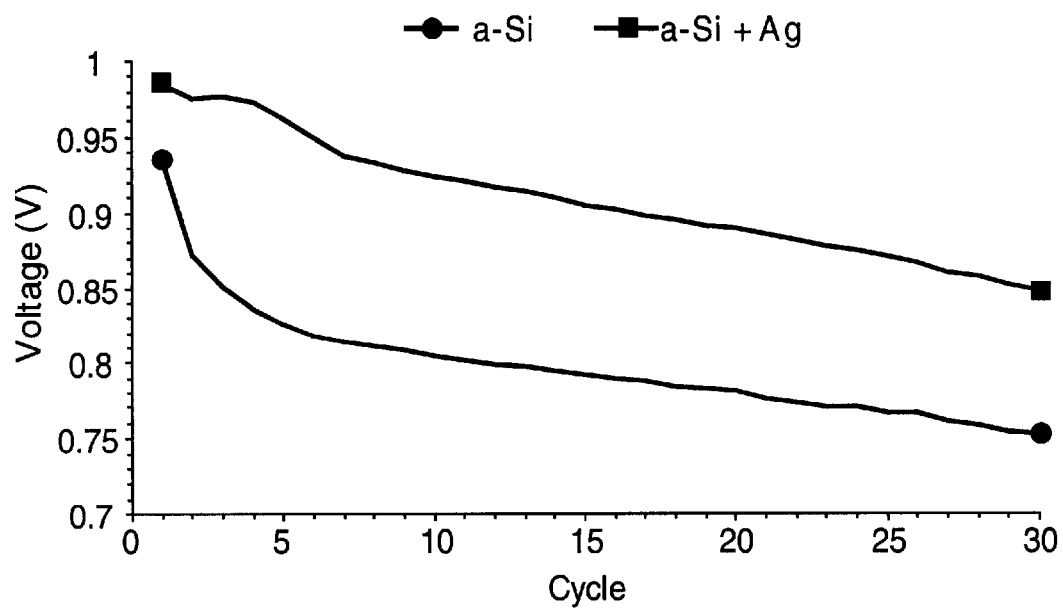
FIG. 14 illustrates the cycling performance, in terms of charge rest voltage, of samples described in Example 10 prepared with and without an electrically conductive silver layer.

A sample of an amorphous silicon powder (Iowa Thin Films, Ames, Iowa) formed by chemical vapor deposition was coated with silver as described in the Electroless Plating Procedure" described above. The target amount of silver was 10 wt. %. The resulting powder was combined with a binder and coated onto a second copper foil to form an electrode following the procedure of Example 2. The final dried coating contained 50 wt. % amorphous silicon, 35 wt. % Super-P carbon, and 15 wt. % polyvinylidene fluoride. The electrode was used to construct a 2325 coin cell and tested as described in Example 2. The cells were discharged to 1400 mAh per gram of silver-coated silicon, and then charged to 1.2 V, repeatedly, at a C/4 rate. The cycling results, terms of charge rest voltage, are shown in FIG. 14, along with results for a cell in which the electrode contained the same amorphous silicon powder but without a silver coating. The results shown in FIG. 14 demonstrate that partially covering the amorphous silicon particle with an electrically conductive layer of silver improves the charge efficiency of the electrode.

A number of embodiments of the invention have been described. Nevertheless, it will be understood that various modifications may be made without departing from the spirit and scope of the invention.

What is claimed is:

1. An electrode composition comprising:
   (a) a plurality of composite particles, each of which comprises (i) an electrochemically active metal particle and (ii) an electrically conductive layer partially covering said particle,
      wherein said layer is present in an amount no greater than about 75 wt. % of said composite; and
   (b) a plurality of electrically conductive diluent particles admixed with said composite particles.

2. An electrode composition according to claim 1 where said layer is present in an amount no greater than about 50 wt. % of said composite.

3. An electrode composition according to claim 1 wherein said layer is present in an amount no greater than about 25 wt. % of said composite.

4. An electrode composition comprising:
   (a) a plurality of composite particles, each of which comprises (i) an electrochemically active metal particle and (ii) an electrically conductive layer partially covering said particle,
      wherein said layer is present in an amount no greater than about 75 vol. % of said composite; and
   (b) a plurality of electrically conductive diluent particles admixed with said composite particles.

5. An electrode composition according to claim 1 or 4 wherein said metal particle comprises a metal selected from the group consisting of aluminum, silicon, tin, antimony, lead, germanium, magnesium, zinc, cadmium, bismuth, and indium.

6. An electrode composition according to claim 1 or 4 wherein said metal particle comprises silicon.

7. An electrode composition according to claim 6 wherein said metal particle comprises amorphous silicon.

8. An electrode composition according to claim 1 or 4 wherein said metal particle further comprises an electrochemically inactive elemental metal.

9. An electrode composition according to claim 8 wherein said electrochemically inactive elemental metal is selected from the group consisting of molybdenum, niobium, tungsten, tantalum, iron, nickel, manganese, and copper.

10. An electrode composition according to claim 1 or 4 wherein said metal particle consists essentially of at least one electrochemically inactive elemental metal and at least one electrochemically active elemental metal in the form of an amorphous mixture at ambient temperature that remains amorphous when said electrode composition is incorporated into a lithium battery and cycled through at least one full charge-discharge cycle at ambient temperature.

11. An electrode composition according to claim 10 wherein said metal particle consists essentially of silicon, tin, and copper.

12. An electrode composition according to claim 1 or 4 wherein said layer comprises electrically conductive carbon particles dispersed in a polymeric binder.

13. An electrode composition according to claim 12 wherein said polymeric binder comprises polyvinylidene fluoride.

14. An electrode composition according to claim 1 or 4 wherein said layer comprises a metal.

15. An electrode composition according to claim 14 wherein said layer comprises copper.

16. An electrode composition according to claim 14 wherein said layer comprises chromium.

17. An electrode composition according to claim 14 wherein said layer comprises silver.

18. An electrode composition according to claim 1 or 4 wherein said layer is non-graphitic.

19. An electrode composition according to claim 1 or 4 further comprising a polymeric binder in which said composite particles and said diluent particles are dispersed.

20. An electrode composition according to claim 19 wherein said polymeric binder comprises polyvinylidene fluoride.

21. An electrode composition according to claim 4 wherein said layer is present in an amount no greater than about 50 vol. % of said composite.

22. An electrode composition according to claim 4 wherein said layer is present in an amount no greater than about 25 vol. % of said composite.

23. An electrode composition according to claim 1 or 4 wherein said layer is porous.

24. An electrode composition according to claim 23 wherein said layer has a porosity of about 90%.

25. A lithium ion battery comprising:
   (A) a first electrode comprising:
      (a) a plurality of composite particles, each of which comprises (i) an electrochemically active metal particle and (ii) an electrically conductive layer partially covering said particle,
         wherein said layer is present in an amount no greater than about 75 wt. % of said composite; and
      (b) a plurality of electrically conductive diluent particles admixed with said composite particles;
   (B) a counterelectrode; and
   (C) an electrolyte separating said electrode and said counterelectrode.

26. A lithium ion battery comprising:
   (A) a first electrode comprising:
      (a) a plurality of composite particles, each of which comprises (i) an electrochemically active metal particle and (ii) an electrically conductive layer partially covering said particle,
         wherein said layer is present in an amount no greater than about 75 vol. % of said composite; and
      (b) a plurality of electrically conductive diluent particles admixed with said composite particles;
   (B) a counterelectrode; and
   (C) an electrolyte separating said electrode and said counterelectrode.

* * * * *

UNITED STATES PATENT AND TRADEMARK OFFICE
CERTIFICATE OF CORRECTION

PATENT NO.       : 6,664,004 B2
APPLICATION NO. : 09/883865
DATED            : December 16, 2003
INVENTOR(S)      : Krause et al.

It is certified that error appears in the above-identified patent and that said Letters Patent is hereby corrected as shown below:

Column 2
Line 28, delete "fall" and insert -- full --, therefor.

Column 4
Line 59, after "Preparation" start a new paragraph.
Line 66. delete "de" and insert -- dc -- , therefor.

Column 6

Line 23, delete "$\Sigma_r$" and insert -- $\Sigma_i$ --, therefor.

Line 27, delete "Wi" and insert -- $w_i$ --, therefor.

Line 33, delete "Pobs= $^m$Tobs¦ $^v$Tobs $^{=m}$ Tobs ¦ [$^A$ Tobs $^t$ Tobs]" and insert -- $P_{obs} = {}^m T_{obs}/{}^V T_{obs} {}^{=m} T_{obs}/[{}^A T_{obs} {}^t T_{obs}]$ -- therefor.

Line 48, delete "ammoniumn" and insert -- ammonium --, therefor.

Column 7
Line 8, delete "CAlifoils," and insert -- (Allfoils, -- therefor.
Line 26, delete "110%" and insert -- 10% --, therefor.

Column 9
Line 51, delete "1A" and insert -- IA -- , therefor.

UNITED STATES PATENT AND TRADEMARK OFFICE
CERTIFICATE OF CORRECTION

PATENT NO. : 6,664,004 B2
APPLICATION NO. : 09/883865
DATED : December 16, 2003
INVENTOR(S) : Krause et al.

It is certified that error appears in the above-identified patent and that said Letters Patent is hereby corrected as shown below:

<u>Column 10</u>
Line 34, delete "nmAh/g" and insert -- mAh/g --, therefor.

Signed and Sealed this

Thirty-first Day of October, 2006

JON W. DUDAS
*Director of the United States Patent and Trademark Office*